United States Patent [19]

Chu

[11] Patent Number: 5,249,956
[45] Date of Patent: Oct. 5, 1993

[54] MULTIFUEL HEATER

[75] Inventor: William H. Chu, Lake Orion, Mich.

[73] Assignee: The United States of America as represented by the Secretary of the Army, Washington, D.C.

[21] Appl. No.: 988,059

[22] Filed: Dec. 4, 1992

[51] Int. Cl.⁵ ............................................... F23D 3/40
[52] U.S. Cl. ........................................ 431/326; 431/263; 431/116; 431/300; 237/12.3 C; 126/110 B; 126/116 R
[58] Field of Search ........... 126/110 B, 110 R, 110 C, 126/116 R; 431/260–263, 326, 354, 116, 300, 115; 237/12.3 C

[56] References Cited

U.S. PATENT DOCUMENTS

| 2,492,756 | 12/1949 | McCollum | 431/263 |
| 3,086,579 | 4/1963 | Brown | 431/262 |
| 3,523,004 | 8/1970 | Mellett et al. | 431/116 |
| 3,602,621 | 8/1971 | Mellett et al. | 431/116 |
| 4,530,658 | 7/1985 | Panick | 237/12.3 C |
| 4,669,973 | 6/1987 | Langen et al. | 237/12.3 C |
| 5,137,445 | 8/1992 | Chu | 431/326 |

Primary Examiner—James C. Yeung
Attorney, Agent, or Firm—Peter A. Taucher; David L. Kuhn

[57] ABSTRACT

An improved multi-fuel heater using a porous fuel vaporizer in close proximity to an burner cup the improved heater having means to ameliorate the build up of particulate material between the cup and the vaporizer.

1 Claim, 1 Drawing Sheet

MULTIFUEL HEATER

GOVERNMENT INTEREST

The invention described herein may be manufactured, used and licensed by or for the Government for governmental purposes without payment to me of any royalty.

BACKGROUND OF THE INVENTION

1. Field of the Invention

In one aspect this invention relates to supplemental heaters for use in vehicles. In a further aspect, this invention relates to multifuel heaters using an external combustion air supply and external exhaust for use in heating vehicles.

2. Prior Art

The use of a supplementary, forced air heater in vehicles is well known. In military vehicles such heaters are subjected to unusual extremes of environmental conditions including excessive dust. The conditions are much more extreme than those encountered by normal vehicles which makes normal commercial heaters inefficient and short lived.

One example of a commercial air heater is disclosed in U.S. Pat. No. 3,523,004. This Patent discloses a heater configuration with a casing forming a combustion chamber and having an associated blower for forcing combustion air longitudinally through the combustion chamber. The burner has an internal apertured plate located transversely across the casing to direct the combustion air along predefined longitudinal paths. A cupped shaped number is positioned down stream from the plate with its open end facing toward the apertured plate to receive the combustion air. A wick is coaxially mounted in the combustion chamber and is connected to a fuel source which feeds liquid fuel to the wick for vaporization and combustion.

Burners of this general configuration have provided good performance characteristics under various conditions; however, they have problems with the dust and debris commonly encountered under battlefield conditions. The debris and dust particles entering the heater tend to accumulate in the bottom of the vaporizing cup. This results in constricted air flow and impedes the heater's flame path as the flame exits the vaporizing shield. The dirt and any unburned combustion product also eventually coat the porous fuel vaporizer. In extreme cases, the dirt will block the fuel vaporizer to the extent the heater can not function adequately. The heater must then be rebuilt before the end of its normal life cycle.

This problem is particularly acute since the combustion air must be drawn from the ambient surroundings and can not be filtered. Filtration of the combustion air is not practicable on military vehicles since filtration would cause a pressure drop in the air intake and require frequent filter changes.

BRIEF SUMMARY OF THE INVENTION

The improved heater of this invention has a housing designed to hold the various components making up the heater with a heat exchanger being formed as an integral part of the housing. A fuel supply and blower assembly for forcing air through the heater for combustion of fuel and to be heated for use in heating are mounted in the housing. A fuel supply provides fuel to a burner assembly mounted within the housing the assembly; the burner assembly has an apertured plate, a cup shaped vaporizing shield, a porous ceramic fuel vaporizer, and a burner cup with an associated wick. The vaporizing shield and burner cup of this invention are designed to prevent or minimize dirt build up on the heater components

DETAILED DESCRIPTION OF PREFERRED EMBODIMENTS

Figure 1:
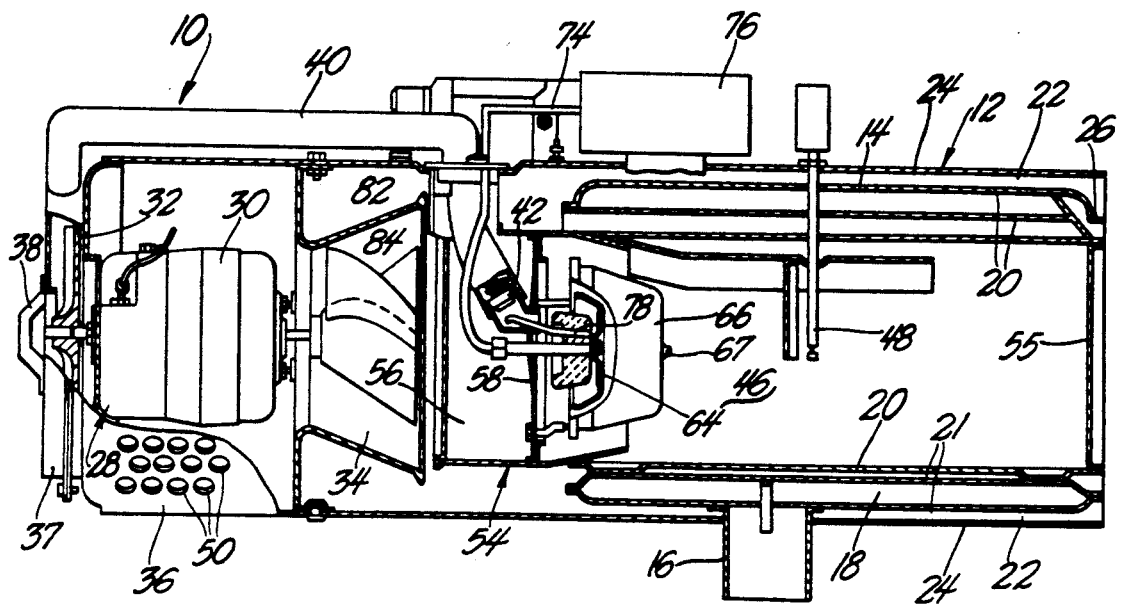
FIG. 1. is a side view of one embodiment of this invention.

Referring to the accompanying drawing where like numerals refer to like parts, and initially to FIG. 1, a supplemental heater 10 according to this invention comprises three interrelated portions: a heat exchanger, a blower assembly and a burner assembly. The heat exchanger portion of this invention has a housing 12 which provides both the means for mounting the heater on a vehicle to be heated and the support for the remainder of the heater components. The mounting bracketry for attaching the heater to the vehicle is not shown since each vehicle requires an individualized mounting bracket and the bracket structure is not part of this invention. Design and fabrication of military specification brackets is within the skill of the art.

Combustion of the fuel takes place within the heat exchanger housing 12 and is described in greater detail below. The hot combustion gases formed by the combustion of fuel are driven through a heat exchanger 14 formed in the housing 12 and out an exhaust outlet 16 on the surface of the housing, the exhaust being vented to the ambient atmosphere. In operation, the hot combustion gases are driven through a first plenum 22 defined by the outer surface 21 of the heat exchanger and the outer casing 24 of the housing 12. The heated ventilation air, warmed by the passage of the combustion gases, exits a second heat exchanger plenum 18 at outlet 26 and enters the passenger compartment of the vehicle. In military vehicles, the ventilating air is drawn from the passenger compartment in a recycle mode and not from the outside atmosphere. Recycling is necessary in order to prevent the incursion of contaminated battle field air which is assumed to contain nuclear, biological or chemical contaminants.

The blower portion of the heater has an air blower assembly 28 mounted on one end of the heat exchanger housing 12. The air blower assembly 28 has a motor 30 which drives both a combustion air impeller 32 and a ventilation air impeller 34. A shroud 36 surrounds the motor 30 and the impellers.

The combustion air impeller 32 is enclosed in an impeller housing 37 attached to one end of the shroud 36 and provides the air necessary to support fuel combustion within the combustion chamber 46 of housing 12. The combustion air impeller 32 shown is of the radial flow turbine type and will provide sufficient air to the combustion chamber at a positive pressure to support the heater's requirements. The combustion air is drawn from the ambient atmosphere by means of duct work, not shown, and will enter the combustion air impeller housing 37 at an inlet 38 located on the end of the shroud 36. As it turns, the combustion air impeller 32 will draw the combustion air into the impeller housing 37 and force it out of the impeller housing into a combustion air tube 40. The combustion air in tube 40 is forced into a chamber 56 for further direction into the burner assembly. The combustion air impeller 32 will generally be controlled so it runs at a reduced rate during the initial starting cycle to provide a rich fuel/air mixture to initiate burning. When a flame detector switch 48 senses that ignition has taken place and burning has commenced, the combustion air impeller is accelerated until both impellers 32, 34 are running at operating speed. A fuller description of the combustion process is contained in the burner assembly description below.

The ventilation air to be heated is drawn into the blower portion of the heater assembly at the shroud 36 through a plurality of apertures 50 and moved by the ventilation air impeller 34 past a wall 54 and into a second plenum 22 where the ventilation air will be heated to the desired temperature as it passes over the heated outer surfaces 20, 21 of the heat exchanger and is discharged back into the passenger compartment (not shown).

The burner portion of the heater and the heat exchanger portion cooperate at the entry end of the combustion chamber which is defined by a wall 54 located on an extension of the cylindrical surfaces 20 of the heat exchanger; the wall 54 seals one end of the combustion chamber 46 the other end of the combustion chamber being sealed by a wall 55.

Figure 2:
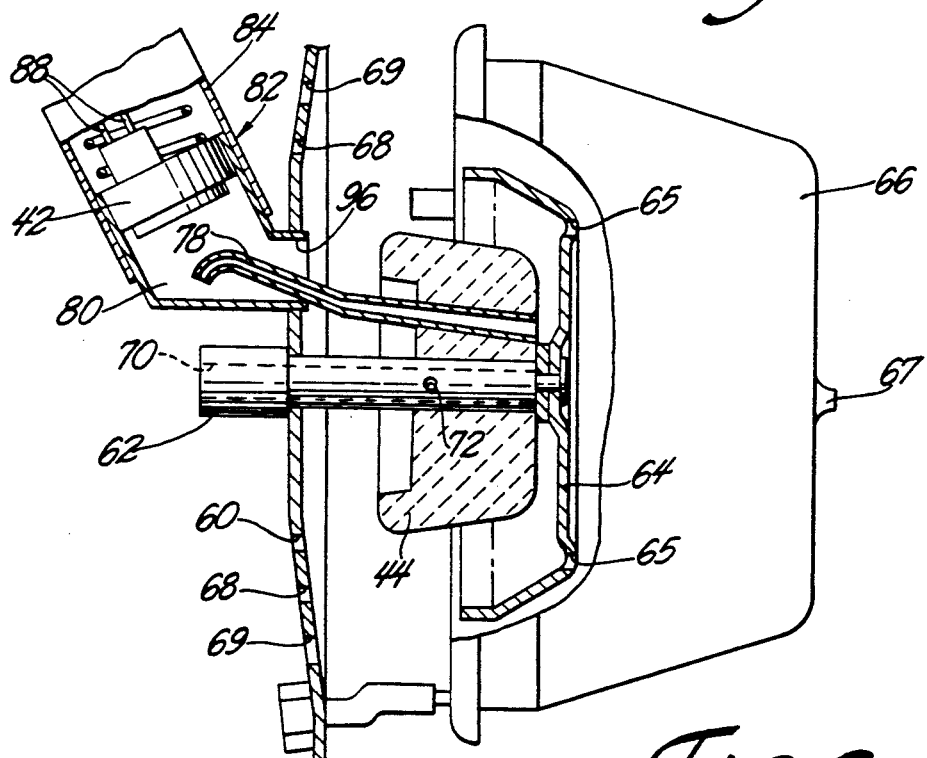
FIG. 2 is an enlarged section of FIG. 1 showing the burner assembly in greater detail.

The burner assembly portion of the heater is shown in greater detail in FIG. 2. It has an igniter 42 to initiate burning, a wick 78, a fuel vaporizer 44, nested concentric cups comprising a vaporizer shield 64, and a burner cup 66. The porous fuel vaporizer 44 has a wick 78 with one end in the porous fuel vaporizer 44, the wick extending back through the apertured plate 58 to an igniter pocket 80. The wick 78 will provide fuel to the space in the lower portion of the igniter pocket 80 near the wick forming a very rich fuel-air mixture in the space to initiate ignition. Once there is ignition, the flame will pass around the end of the wick and through an opening 96 in the apertured plate 58 to further ignite the larger quantity of air-fuel mixture surrounding the porous fuel vaporizer 44. The igniter pocket 80 is in close proximity to the igniter assembly 82 which has an igniter tube 84 carrying the igniter element. The igniter element 42 can be of the wound resistance type element controlled by an electrical ignition and control system such as the one disclosed in U.S. Pat. No. 3,498,731. The disclosure of this patent with respect to ignition and control systems is incorporated herein by reference. The igniter 42 is attached to a source of electrical power by leads 88 which will cause the igniter to glow during start up of the heater and ignite the rich fuel-air mixture in the igniter pocket. The combustion air tube 40 directs combustion air from the combustion air impeller 32 into a chamber 56 defined by the wall 54, a portion of the cylindrical walls 20, and an apertured support plate 58. Although the combustion air tube 40 appears to be coaxial with the igniter 82, it is connected to the housing 12 at a point offset from the igniter 82 so as to discharge air into the chamber 56 at a point offset from the igniter housing.

The combustion chamber 46 is formed with an apertured support plate 58 mounted across the end of the combustion chamber 46 near the wall 54. The apertured plate 58 and wall 54 in combination with the extension of the cylindrical walls 20 define the chamber 56 into which the combustion air tube 40 discharges pressurized combustion air. The apertured plate 58 is also used to mount and maintain additional parts of the burner assembly as detailed above in the desired configuration and hold them within the housing 12. The apertured plate 58 is formed with three concentrically arranged sets of apertures 60, 68, 69. Each of the aperture rings has a different size and function to play in the operation of the heater but all the apertures in a defined ring are the same size and configuration. The aperture rings cause the combustion air forced from the chamber 56 through the apertured plate 58 to flow along three concentric, spaced, well defined cylindrical flow paths. Air flowing through apertures 60 is the primary air for vaporization and provides the initial flame ignition. Air through the second concentric ring 68 is designed for maximum flame penetration into the burner cup 66. This is the zone of the inner flame cone. Most of the carbon monoxide, hydrogen, free oxygen and nitrogen will be formed deep in this pressurized zone inside the burner cup. Air from the outer ring 69 provides air to complete the secondary combustion and convert carbon monoxide to carbon dioxide and hydrogen to water vapor. This ring of air is directed to the outer mouth of the combustion cup. The provision of three distinct air paths facilitates the vaporization of fuel, supports complete combustion, and increases the flame path within a minimum space. These features are particularly desirable where space is at a premium such as in military vehicles.

In operation, primary combustion air will flow from the pressurized air in chamber 56 through the apertures 60 arranged concentrically about a support stud 62 attached to the apertured plate. The stud also serves to hold many of the burner assembly elements together and in alignment. The primary combustion air from each aperture 60 will flow along a path parallel to the stud 62 which takes the combustion air over the outer surface of the fuel vaporizer 44. As the primary combustion air passes over the fuel vaporizer 44, liquid fuel will evaporate from the surface of the fuel vaporizer forming a fuel-air mixture.

The primary combustion air and fuel mixture will hit the interior surface of the vaporizer shield 64 which will direct the fuel air mixture back towards the apertured plate 58. When the heater has begun to operate there will sufficient heat in the heater to begin the combustion process at this stage. The vaporizer shield 64 by redirecting and reversing the air-fuel mixture will create a higher pressure ring of partially combusted air fuel mixture near the mouth of the vaporizer shield. However this redirection of the fuel air which helps the heater perform efficiently, also creates a problem when used in dusty environments. The reversal of the air flow will cause particulate material to deposit from the air stream. The resulting accumulation of debris inside the vaporizer shield 64 will eventually cause a buildup which blocks the flow of air over the vaporizer and in dusty desert environments will cause the heater to stop functioning.

The present invention solves this problem by providing at least two relief apertures 65 formed in the vaporizer shield 64 and preferably located near the area where the vaporizer shield's wall meets the bottom. The provision of at least two relief apertures 65 in the vaporizer shield 64 provides a path for the dust which inherently tends to collect in the vaporizer cup 64 to escape into the much larger burner, cup 66. The burner cup 66 with its larger size and greater interior space is not as sensitive to dust.

It has been found that the provision of only two holes of approximately 0.07–0.09 inch in diameter will provide sufficient relief to substantially eliminate the problem of the vaporizer shield 64 becoming clogged during operation in dusty environments. This extends the operating time of the heater. Holes of this approximate dimension while preventing or minimizing the effects of dust do not reduce the back flow of fuel-air mixture sufficiently to cause burner inefficiencies.

The porous fuel vaporizer 44 used in this invention can be formed of any porous material which is inert to the fuels used and can also withstand the heat generated by combustion. The porous fuel vaporizer 44, is mounted on the stud 62, the stud 62 being connected to a fuel line 74 (FIG. 1) which in turn is connected to a fuel pump control valve assembly 76. Fuel from the fuel pump is delivered to a bore 70 running longitudinally through the stud 62, the bore having a plurality of apertures 72 radially formed therein the apertures being disposed to deliver liquid fuel to the interior of the porous fuel vaporizer 44. The fuel control technology is within the skill of the art and full details are omitted in the interest of brevity.

The dust exiting from the fuel vaporizing shield 64 will enter the burner cup 66 and flow to its back wall. As shown in FIG. 2, the burner cup 66 has a small aperture 67 which will allow the debris in the burner cup to exit the cup into the combustion chamber 46 where it would tend to be carried by the exhaust to the exhaust outlet 16 and back to the ambient atmosphere.

Various modifications and alterations will become apparent to those skilled in the art without departing from the scope and spirit of this invention and it should be understood this invention is not limited by the illustrative embodiments set forth above.

What is claimed is:

1. In a multi-fuel heater connected to a source of fuel for use as a heater including a heat exchanger housing with a blower assembly mounted on one end of the heat exchanger housing the blower assembly being positioned to force pressurized combustion air to the exhaust outlet and ventilating air to be heated through the heat exchanger housing; a burner assembly mounted within the heat exchanger housing the burner assembly having an apertured plate mounted across the casing and in the path of the combustion air, a burner cup located on the side of the apertured plate opposite the blower assembly to intercept combustion air after it passes through the apertured plate, a porous fuel vaporizer attached to a mounting means anchored to the apertured plate the fuel vaporizer being located between the apertured plate and the burner cup, an burner cup attached to the mounting means coaxially with the fuel vaporizer and located between the fuel vaporizer and the burner cup, and a wick, the wick having one end in contact with the fuel vaporizer so as to receive fuel from the vaporizer, the other end of the wick being located in an igniter pocket near a igniter, the improvement comprising: providing a plurality of apertures in the vaporizer shield, and the burner cup, the apertures being about 0.07 to 0.09 inch in diameter so as to allow dust and debris to exit the vaporizer shield into the larger burner cup without being permanently deposited on the fuel vaporizer's porus surface.

* * * * *